(12) United States Patent
Hori

(10) Patent No.: US 8,278,869 B2
(45) Date of Patent: Oct. 2, 2012

(54) BATTERY SYSTEM AND BATTERY PACK

(75) Inventor: Kunihiko Hori, Osaka (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 573 days.

(21) Appl. No.: 12/566,304

(22) Filed: Sep. 24, 2009

(65) Prior Publication Data

US 2010/0072975 A1 Mar. 25, 2010

(30) Foreign Application Priority Data

Sep. 24, 2008 (JP) ................................ 2008-244090

(51) Int. Cl.
*H01M 10/44* (2006.01)
(52) U.S. Cl. ........................................ 320/106; 320/112
(58) Field of Classification Search .................. 320/106, 320/107, 112
See application file for complete search history.

(56) References Cited

U.S. PATENT DOCUMENTS

| 5,923,148 A * | 7/1999 | Sideris et al. ................. 320/116 |
| 6,175,211 B1 * | 1/2001 | Brotto ............................ 320/106 |
| 6,625,477 B1 | 9/2003 | Wakefield |
| 7,482,816 B2 * | 1/2009 | Odajima et al. ............... 324/548 |
| 2008/0238357 A1 | 10/2008 | Bourilkov et al. |
| 2009/0070514 A1 * | 3/2009 | Moriyama et al. ............ 710/311 |

FOREIGN PATENT DOCUMENTS

JP 2003209932 7/2003

* cited by examiner

*Primary Examiner* — Jay Patidar
(74) *Attorney, Agent, or Firm* — NDQ&M Watchstone LLP

(57) ABSTRACT

To provide a battery system that can detect connecting locations of a plurality of battery packs with a simple structure, the battery system includes a plurality of terminal blocks 21 to 24 to which the plurality of battery packs 11 to 14 are connected. Each battery pack includes a first battery power supply terminal 15, a second battery power supply terminal 18, and a battery ID terminal 17. A power supply voltage is applied between the first and second battery power supply terminals 15, 18, and the battery ID terminal 17 divides the power supply voltage into a first voltage to be applied between the first battery power supply terminal 15 and the battery ID terminal 17, and a second voltage to be applied between the second battery power supply terminal 18 and the battery ID terminal 17, when the battery pack is connected to the terminal block. A voltage dividing ratio of the first voltage or the second voltage with respect to the power supply voltage is made to be different among the plurality of battery packs depending on the terminal blocks, and the control circuit 2 detects the voltage dividing ratio and determines the terminal blocks to which the battery packs are connected.

5 Claims, 3 Drawing Sheets

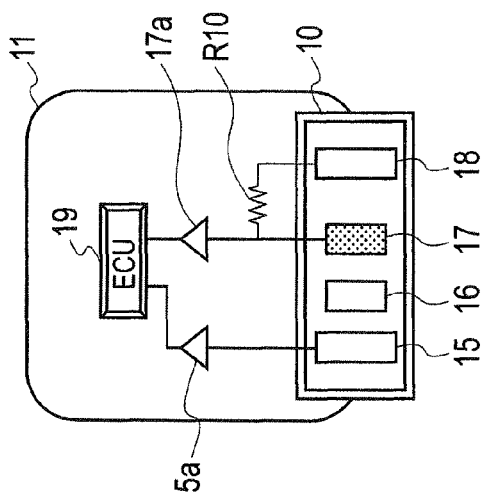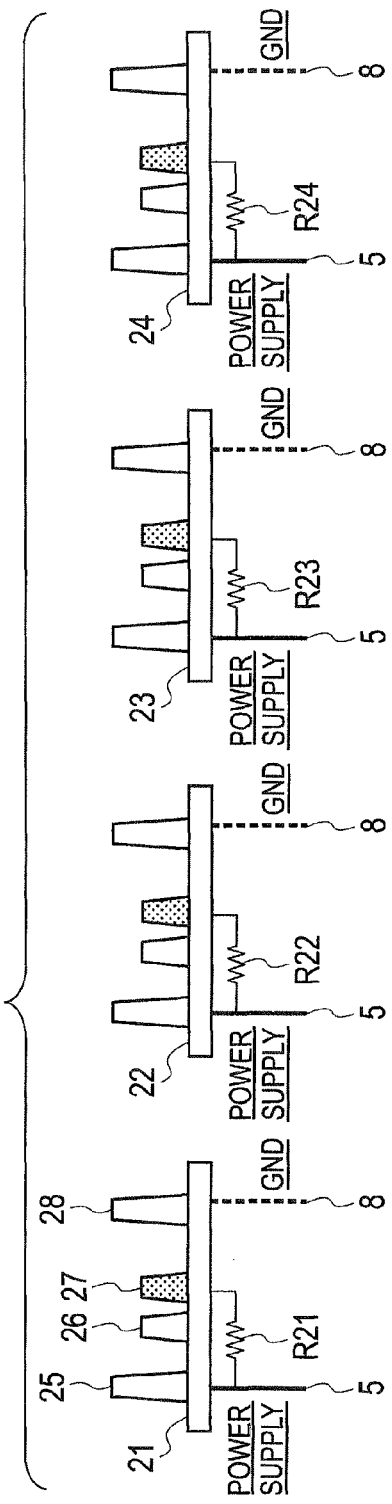
FIG. 2
FIG. 3

BATTERY SYSTEM AND BATTERY PACK

CROSS REFERENCE TO RELATED APPLICATIONS

This application claims priority based on 35 USC 119 from prior Japanese Patent Application No. P2008-244090 filed on Sep. 24, 2008, the entire contents of which are incorporated herein by reference.

BACKGROUND OF THE INVENTION

1. Field of the Invention

The present invention relates to a battery system for controlling a plurality of battery packs. The present invention also relates to a battery pack used in such a battery system.

2. Description of Related Art

A conventional battery system is disclosed for example in Japanese patent Laid-Open No. 2003-209932 (pages 4-6 and FIG. 1). This battery system is mounted for example in a vehicle and has a plurality of battery packs. An operation state of each battery pack is controlled at a battery ECU (Engine Control Unit) provided at each battery pack, and any abnormal state is detected. At each battery pack ECU, address setting terminals are provided having the same number of address bits as the number of battery packs that are provided. In addition, address lines are provided having the same number as the bits and the address setting terminals.

Each address line is connected in different combinations to the address setting terminals of each battery ECU respectively. As such, ID numbers corresponding to connecting locations of the battery packs are detected through the address lines from the vehicle side. Thus, it is possible to identify a battery pack in an abnormal state and to perform a control from the vehicle side such as to disconnect or disable the abnormal battery pack. In addition, by connecting the predetermined combination of the address lines to a terminal block to which a battery pack is connected, the ID number of the connecting location can be made constant even if the battery pack is replaced.

However, according to the above-described conventional battery system, it is necessary to provide the same number of address setting terminals and address lines as the number of bits corresponding to the number of battery packs in order to detect the connecting locations of the battery packs. Thus, the electronic circuit of such conventional system is complex and costly.

Therefore, an object of the invention is to provide a battery system that can reduce cost by detecting connecting locations of the battery packs with a simple structure, and also to provide a battery pack used in such a battery system.

SUMMARY OF THE INVENTION

One aspect of the invention relates to a battery system having a plurality of battery packs, a plurality of terminal blocks to which the plurality of battery packs are connected, and a control circuit for controlling an operation of the battery packs connected to the terminal blocks, in which each battery pack includes a first battery power supply terminal, a second battery power supply terminal, and a battery ID terminal, in which a power supply voltage having a predetermined voltage is applied between the first battery power supply terminal and the second battery power supply terminal, in which the battery ID terminal divides the power supply voltage into a first voltage to be applied between the first battery power supply terminal and the battery ID terminal, and a second voltage to be applied between the second battery power supply terminal and the battery ID terminal, when the battery pack is connected to one of the terminal blocks, in which a voltage dividing ratio expressed as a ratio of the first voltage with respect to the power supply voltage or a ratio of the second voltage with respect to the power supply voltage is made to be different among the plurality of battery packs depending on the terminal blocks, such that the control circuit determines the terminal blocks to which the battery packs are connected by detecting the voltage dividing ratio.

According to this structure, the first battery power supply terminal, the second battery power supply terminal, and the battery ID terminal are provided at the battery pack. In the battery pack, the power supply voltage is applied between the first and second battery power supply terminals. When the battery pack is connected to one of the terminal blocks, the first voltage, which is a divided voltage of the power supply voltage, is applied between the first battery power supply terminal and the battery ID terminal, and the second voltage, which is a divided voltage of the power supply voltage, is applied between the second battery power supply terminal and the battery ID terminal. The voltage dividing ratio, which is a ratio of the first voltage or the second voltage with respect to the power supply voltage, differs among the battery packs depending on the terminal blocks, and the control circuit detects the voltage dividing ratio and determines the terminal block to which the battery pack is connected. Therefore, providing a battery ID terminal at one place in each battery pack is sufficient in order to identify connecting locations of the plurality of battery packs. Thus, the battery pack at each connecting location can be controlled according to the terminal blocks.

In addition, according to another aspect of the invention, in the battery system of the above structure, each terminal block has a first power supply terminal, a second power supply terminal, and an ID terminal respectively to be connected to the first battery power supply terminal, the second battery power supply terminal, and the battery ID terminal. At each battery pack, a first resistance having the same value is connected between the first battery power supply terminal and the battery ID terminal, and at each of the terminal blocks, a second resistance having respectively different values is connected between the second terminal and the ID terminal.

According to this structure, the first and second power supply terminals and the ID terminal respectively to be connected to the first and second battery power supply terminals and the battery ID terminal are provided at the terminal block. When the battery pack is connected to the terminal block, the first resistance is connected between the first battery power supply terminal and the battery ID terminal, and the second resistance is connected between the battery ID terminal and the second battery power supply terminal via the terminal block. Therefore, the power supply voltage is divided between the first and second battery power supply terminals by the first resistance and the second resistance.

In addition, according to one aspect of the invention, in the battery system having the above structure, the first battery power supply terminal and the first power supply terminal are set to ground potential.

Moreover, according to one aspect of the invention, in the battery system having the above structure, the battery pack has a battery ECU that detects the voltage dividing ratio and generates information indicating indicatinge terminal block based on the detected voltage dividing ratio, and a communication unit for performing communication with the control circuit, and the information indicating the terminal block to which the battery pack is connected is sent to the control circuit through the communication unit.

According to this structure, the battery ECU determines the terminal block to which the battery pack is connected, and the determination result is sent to the control circuit by the control unit. As a result, the battery pack is controlled at the control circuit.

Another aspect of the invention is a battery pack to be connected to a terminal block, which includes a first battery power supply terminal, a second battery power supply terminal, and a battery ID terminal, in which a power supply voltage having a predetermined voltage is applied between the first battery power supply terminal and the second battery power supply terminal, in which the battery ID terminal divides the power supply voltage into a first voltage to be applied between the first battery power supply terminal and the battery ID terminal, and a second voltage to be applied between the second battery power supply terminal and the battery ID terminal, when the battery pack is connected to the terminal block, and in which the battery pack further includes a battery ECU which detects a voltage dividing ratio expressed as a ratio of the first voltage with respect to the power supply voltage or a ratio of the second voltage with respect to the power supply voltage.

BRIEF DESCRIPTION OF THE DRAWINGS

FIG. 2 is a configuration diagram showing a battery of the battery system according to the embodiment.

FIG. 3 is a configuration diagram showing terminal blocks of the battery system according to the embodiment.

DETAILED DESCRIPTION OF THE INVENTION

Figure 1:
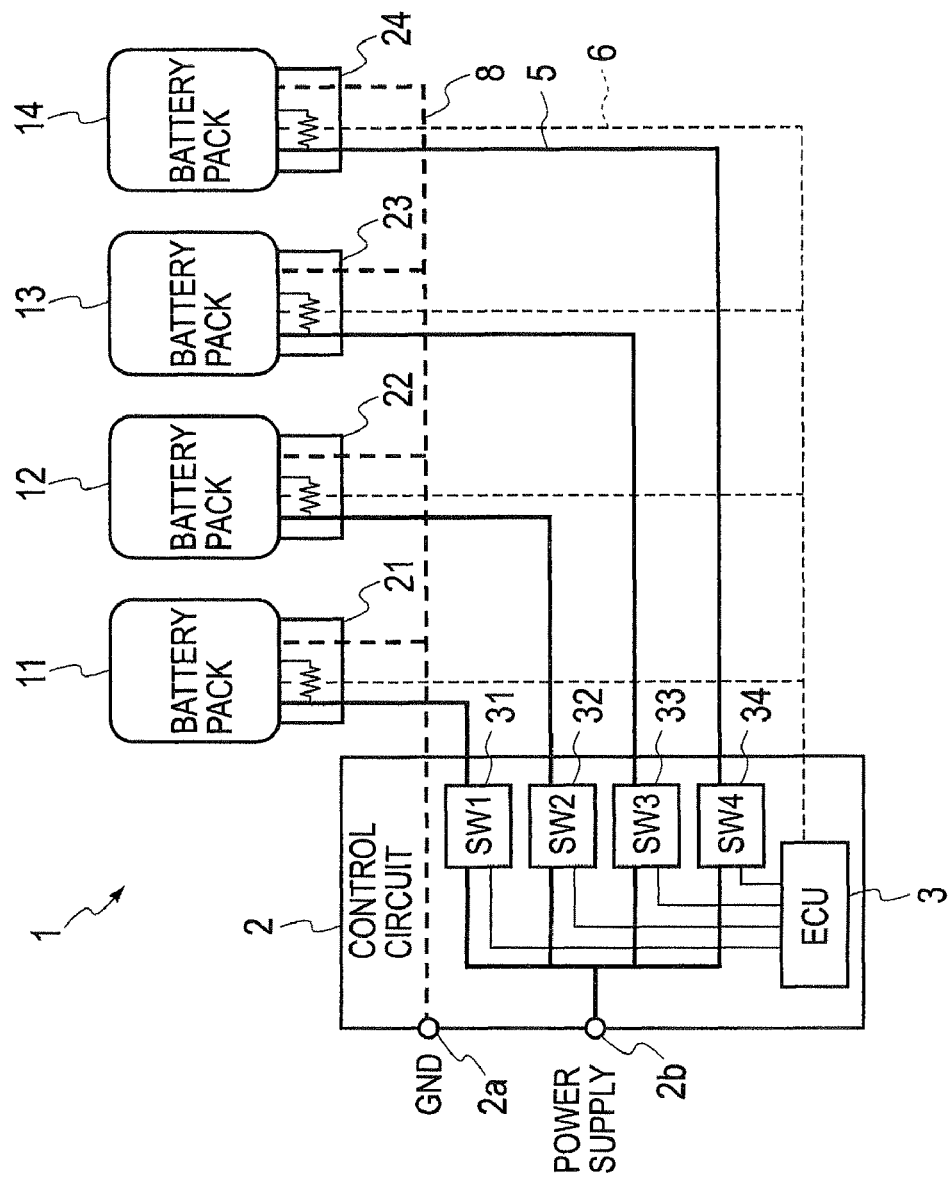
FIG. 1 is a configuration diagram showing a battery system according to one embodiment of the present invention.

Now, specific embodiments of the present invention will be described by referring to the drawings. FIG. 1 is a configuration block diagram showing a battery system according to one embodiment of the present invention. A battery system 1 can be mounted in a mobile device such as a notebook-type personal computer and equipment such as an electric vehicle. The battery system 1 includes a plurality of detachable battery packs 11, 12, 13, and 14, a plurality of terminal blocks 21, 22, 23, and 24 into which the battery packs 11 to 14 are respectively loaded, and a control circuit 2.

In the control circuit 2, a ground connection unit 2a, a power supply connection unit 2b, an ECU (Electronic Control Unit) 3, and switches SW1, SW2, SW3, and SW4 are provided. The ground connection unit 2a is connected to a ground potential of the equipment in which the battery system 1 is mounted. In addition, the ground connection unit 2a is connected in parallel to a ground terminal 28 (see FIG. 3) of each terminal block 21 to 24 through a ground line 8. The power supply connection unit 2b is connected in parallel to a power supply terminal 25 (see FIG. 3) of each terminal block 21 to 24 via the switches SW1 to SW4 through a power supply line 5.

The ground terminal 28 and the power supply terminal 25 respectively are electrically connected to a battery ground terminal 18 and a battery power supply terminal 15 of the battery packs 11 to 14, the details of which will be described below. As such, the power supply voltage is applied between the ground connection unit 2a and the power supply connection unit 2b, and electric power is supplied to the equipment in which the battery system 1 is mounted.

The ECU 3 controls an operation of each battery pack 11 to 14 by turning on or off the switches SW1, SW2, SW3, and SW4. Also, the ECU 3 and a communication terminal 26 (see FIG. 3) of each terminal block 21 to 24 (which will be described below) are connected through a communication line 6 via LAN such as CAN or LIN. As such, the ECU 3 can communicate with a battery ECU 19 (see FIG. 2) of the battery packs 11 to 14, which will be described below.

FIG. 2 is a configuration view showing the battery pack 11. Each battery pack 11 to 14 has the same structure, and is provided with a terminal unit 10. Through the terminal unit 10, the battery pack 11 can be connected to any of the terminal blocks 21 to 24. Within the battery pack 11, a battery ECU 19 is provided which controls an operation state by detecting a power supply voltage, a temperature etc. of the battery pack 11. Moreover, the battery ECU 19 has a communication unit (not shown) that performs communication with the ECU 3 (see FIG. 1) through the communication line 6.

The battery power supply terminal 15, the battery communication terminal 16, the battery ID terminal 17, and the battery ground terminal 18 are provided at the terminal unit 10. The battery ground terminal 18 is connected to ground potential, and the power supply voltage from a battery cell (not shown) is applied between the battery power supply terminal 15 and the battery ground terminal 18. The battery power supply terminal 15 is connected to the battery ECU 19 through a gate 15a, and the power supply voltage can be detected at the battery ECU 19.

The battery communication terminal 16 is connected to a communication unit of the battery ECU 19. The battery ID terminal 17 is electrically connected to the battery ground terminal 18 through a resistance R10. Also, the battery ID terminal 17 is connected to the battery ECU 19 through a gate 17a, and an electric potential of the battery ID terminal 17 can be detected at the battery ECU 19.

FIG. 3 is a configuration view showing the terminal blocks 21 to 24. Each of the terminal blocks 21 to 24 includes the power supply terminal 25, the communication terminal 26, the ID terminal 27, and the ground terminal 28. The power supply line 5 is connected to each power supply terminal 25 in parallel, and each power supply terminal 25 respectively contacts and is electrically connected to the battery power supply terminal 15 of the battery packs 11 to 14.

The ground line 8 is connected to each ground terminal 28 in parallel, and each ground terminal 28 is connected to the ground potential through the ground connection unit 2a (see FIG. 1). Also, the ground terminal 28 contacts and is electrically connected to the battery ground terminal 18 of the battery packs 11 to 14 respectively. The communication terminal 26 of each terminal block 21 to 24 respectively contacts and is electrically connected to the battery communication terminal 16 of the battery packs 11 to 14, and the communication line 6 (see FIG. 1) is connected to the communication terminal 26 of each terminal block 21 to 24.

The ID terminal 27 contacts and is electrically connected to the battery ID terminal 17 of the battery packs 11 to 14 respectively. In addition, each ID terminal 27 is connected to the power supply terminal 25 through resistances R21, R22, R23, and R24 respectively having different resistance values.

As such, the power supply voltage is divided, and a first voltage is applied between the ID terminal final 27 and the ground terminal 28, and a second voltage is applied between the ID terminal 27 and the power supply terminal 25. At the same time, the first voltage is applied between the battery ID terminal 17 and the battery ground terminal 18, and the second voltage is applied between the battery ID terminal 17 and the battery power supply terminal 15. An electric potential of the battery ID terminal 17 is detected at the battery ECU 19, and the voltage dividing ratio can be detected which is expressed as a ratio of the first voltage with respect to the power supply voltage (the first voltage/the power supply voltage) or a ratio of the second voltage with respect to the power supply voltage (the second voltage/the power supply voltage).

For example, in a case in which the power supply voltage is 40V; the resistance R10 is 10 kΩ; the resistance R21 is 30 Ω; the resistance R22 is 10 kΩ, the resistance R23 is 3.3 kΩ; and the resistance R24 is 0 kΩ, the electric potentials of the battery ID terminal 17 of the battery packs 11, 12, 13, and 14 respectively are 10V, 20V, 30V, and 40V. Thus, the voltage dividing ratios at the ground terminal 28 side (the first voltage) with respect to the power supply voltage are 1/4, 2/4, 3/4, and 4/4 respectively. Therefore, by detecting the voltage dividing ratios of the battery packs 11 to 14, the battery ECU 19 can determine to which terminal block 21 to 24 the battery packs 11 to 14 are connected. Moreover, the battery ECU 19 generates information indicating the terminal blocks 21 to 24, and sends the information to the control circuit 2 through the communication unit.

Figure 4:
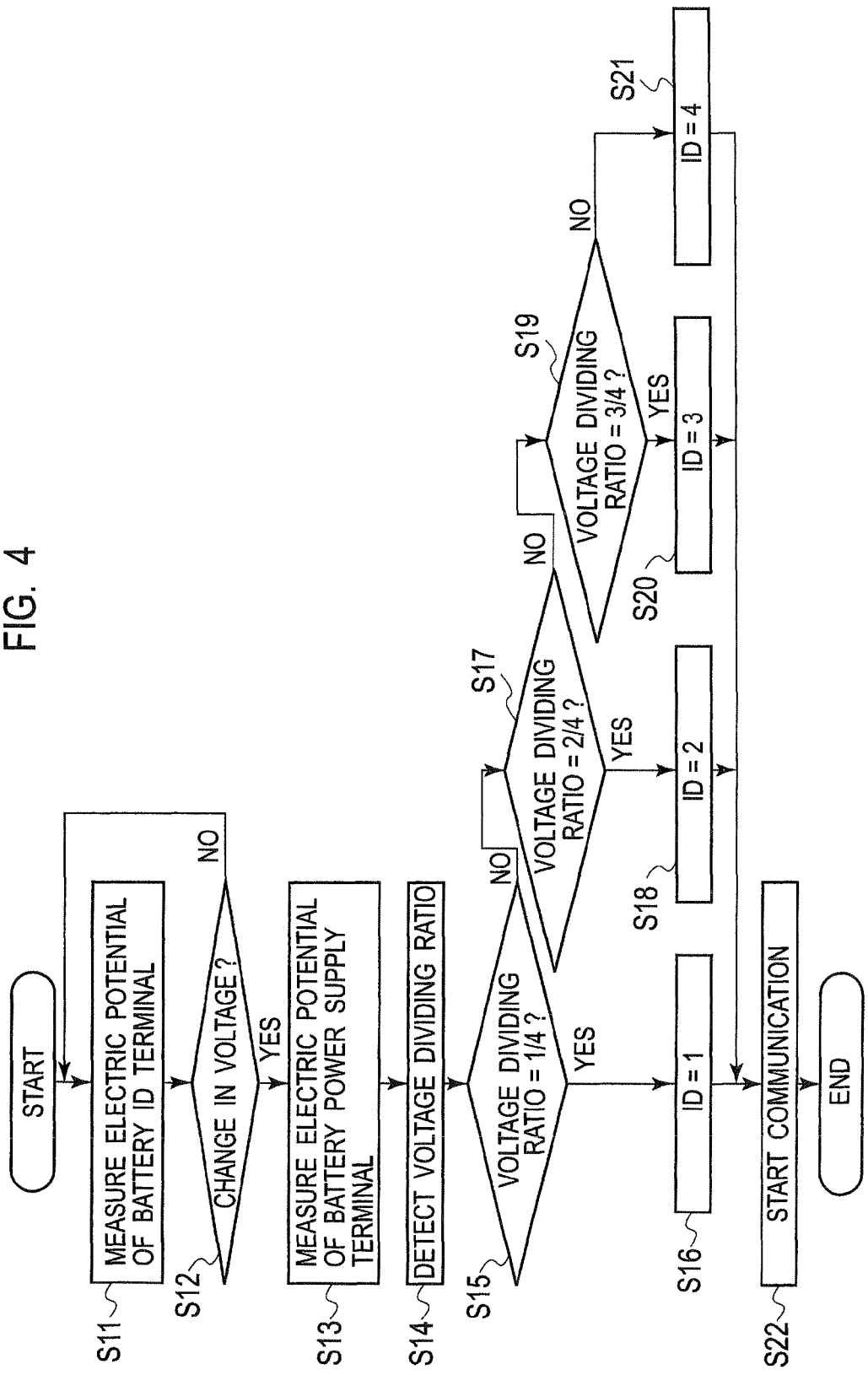
FIG. 4 is a flowchart showing an operation to identify terminal blocks of the battery system according to the embodiment.

FIG. 4 is a flowchart showing an operation to determine the terminal blocks 21 to 24 by the battery ECU 19 of the battery system 1 having the above structure. Here, the power supply voltage and each of the resistance values are as shown in the above example. At step S11, an electric potential of the battery ID terminal 17 is measured at the battery ECU 19. When the battery packs 11 to 14 are not connected, the electric potential of the battery ID terminal 17 is 0V.

At step S12, it is determined whether or not the electric potential of the battery ID terminal 17 has changed. If the electric potential of the battery ID terminal 17 has not changed, the steps S11 and S12 are repeated. By detecting the change in the electric potential of the battery ID terminal 17, it is determined when the battery packs 11 to 14 are first connected to one of the terminal blocks 21 to 24.

If the electric potential of the battery ID terminal 17 has changed, at step S13, an electric potential of the battery power supply terminal 15 is measured at the battery ECU 19 and the power supply voltage is obtained. At step S14, a voltage dividing ratio of the battery ID terminal 17 with respect to the power supply voltage is detected by computation. At step S15, it is determined whether or not the voltage dividing ratio is 1/4. If the voltage dividing ratio is 1/4, the ID number=1 indicating the terminal block 21 is acquired at step S16.

If the voltage dividing ratio is not 1/4, at step S17, it is determined whether or not the voltage dividing ratio is 2/4. If the voltage dividing ratio is 2/4, the ID number=2 indicating the terminal block 22 is acquired at step S18. If the voltage dividing ratio is not 2/4, at step 19, it is determined whether or not the voltage dividing ratio is 3/4. If the voltage dividing ratio is 3/4, the ID number=3 indicating the terminal block 23 is acquired at step S20. If the voltage dividing ratio is not 3/4, the ID number=4 indicating the terminal block 24 is acquired at step S21.

At step S22, the battery ECU 19 starts communication with the ECU 3 through the communication unit. As such, the battery ECU 19 sends information such as a temperature of the battery packs 11 to 14 and the power supply voltage along with the respective ID numbers to the ECU 3.

The ECU 3 controls an operation of the battery packs 11 to 14 by turning on or off the switches SW1 to SW4 corresponding to the ID numbers according to the conditions of the battery packs 11 to 14.

According to the embodiment, at the battery packs 11 to 14 connected to the terminal blocks 21 to 24, the first voltage is applied between the battery ground terminal 18 and the battery ID terminal 17, and the second voltage is applied between the battery power supply terminal 15 and the battery ID terminal 17. A voltage dividing ratio expressed as a ratio of the first voltage with respect to the power supply voltage or a ratio of the second voltage with respect to the power supply voltage differs among the battery packs 11 to 14 respectively depending on the terminal blocks 21 to 24. Then, the voltage dividing ratio is detected by the control circuit 2, and the terminal blocks 21 to 24 are determined to which the battery packs 11 to 14 are connected.

Therefore, it is sufficient to provide a single battery ID terminal 17 at one place at the battery packs 11 to 14 in order to identify the connecting locations of the plurality of battery packs 11 to 14. As such, it is possible to simplify the electric circuit and the cost of the battery system 1 can be reduced.

In addition, as long as the power supply voltage is applied between the battery ground terminal 18 and the battery power supply terminal 15, the battery ground terminal 18 and the ground terminal 28 do not have to be at ground potential. In other words, it is sufficient if the battery packs 11 to 14 are provided with the first and second battery power supply terminals between which the power supply voltage is applied. It is also sufficient if the terminal blocks 21 to 24 are provided with the first and second power supply terminals respectively connected to the first and second battery power supply terminals. However, when the battery ground terminal 18 and the ground terminal 28 are made as the ground potential, it is not necessary to connect the battery ground terminal 18 to the battery ECU 19, and thus, the circuit can be simplified.

In addition, at each of the battery packs 11 to 14, the resistance R10 (first resistance) having the same resistance value is connected between the battery ground terminal 18 (first battery power supply terminal) and the battery ID terminal 17, and at each of the terminal blocks 21 to 24, the resistances R21 to R24 (second resistance) respectively having different resistance values are connected between the power supply terminal 25 (second power supply terminal) and the ID terminal 27. Therefore, it is easily possible to apply a different divided voltage to each battery ID terminal 17.

Also, the resistance R10 may be connected between the battery power supply terminal 15 (first power supply terminal) and the battery ID terminal 17, and the resistances R21 to R24 may be connected between the ground terminal 28 (second power supply terminal) and the ID terminal 27.

Also, the resistance R10 may be connected between the power supply terminal 25 and the battery ID terminal 17, and the resistances R21 to R24 may be connected between the ground terminal 28 and the ID terminal 27. With such configuration, however, an electric potential of the battery ID terminal 17 can become an indefinite value if the battery packs 11 to 14 are removed from the terminal blocks 21 to 24. Therefore, it could be detected erroneously as being in a connected state to the terminal blocks 21 to 24. Therefore, it is more desirable to connect the resistance R10 between the battery power supply terminal 15 or the battery ground terminal 18 and the battery ID terminal 17.

Also, since each of the battery packs 11 to 14 has the communication unit provided within the battery ECU 19, it is possible to easily control an operation of the battery packs 11 to 14 by sending the ID numbers of the terminal blocks 21 to 24 to the ECU 3 of the control circuit 2. In addition, it is also possible to identify the ID numbers of the terminal blocks 21 to 24 by directly detecting the divided voltage ratio at the control circuit 2.

In this embodiment, the battery ECU 19 may control an operation of the battery packs 11 to 14 by identifying the ID numbers of the terminal blocks 21 to 24. For example, in a case in which discharge is performed when a battery pack is connected to one terminal block and charging is performed when a battery pack is connected to another terminal block, the battery ECU 19 may switch the circuit within the battery packs 11 to 14 by determining whether it is the discharge operation or the charging operation that needs to be performed, according to the ID numbers.

According to the present invention, it is possible to provide a battery system that can detect connecting locations of the battery packs with a simple structure thereby reducing cost, and also it is possible to provide a battery pack used in such a battery system.

The present invention can be utilized such as in an electric vehicle and a mobile device having a battery system that controls a plurality of battery packs.

The present invention may be embodied in other specific forms without departing from the spirit or essential characteristics thereof. The embodiments are therefore to be considered in all respects as illustrative and not restrictive, the scope of the present invention being indicated by the appended claims rather than by the foregoing description, and all changes that come within the meaning and range of equivalency of the claims therefore are intended to be embraced therein.

What is claimed is:

1. A battery system, comprising:
    a plurality of battery packs;
    a plurality of terminal blocks to which the plurality of battery packs are connected; and
    a control circuit for controlling an operation of the battery packs connected to the terminal blocks,
    wherein each battery pack includes a first battery power supply terminal, a second battery power supply terminal, and a battery ID terminal,
    wherein a power supply voltage having a predetermined voltage is applied between the first battery power supply terminal and the second battery power supply terminal,
    wherein the battery ID terminal divides the power supply voltage into a first voltage to be applied between the first battery power supply terminal and the battery ID terminal, and a second voltage to be applied between the second battery power supply terminal and the battery ID terminal, when the battery pack is connected to one of the terminal blocks,
    wherein a voltage dividing ratio expressed as a ratio of the first voltage with respect to the power supply voltage or a ratio of the second voltage with respect to the power supply voltage is made to be different among the plurality of battery packs depending on the terminal blocks, such that the control circuit determines the terminal blocks to which the battery packs are connected by detecting the voltage dividing ratio.

2. The battery system of claim 1,
    wherein each terminal block has a first power supply terminal, a second power supply terminal, and an ID terminal respectively to be connected to the first battery power supply terminal, the second battery power supply terminal, and the battery ID terminal, and
    wherein at each battery pack, a first resistance having the same value is connected between the first battery power supply terminal and the battery ID terminal, and at each of the terminal blocks, a second resistance having respectively different values is connected between the second terminal and the ID terminal.

3. The battery system of claim 2, wherein the first battery power supply terminal and the first power supply terminal are placed at ground potential.

4. The battery system of claim 1, wherein each battery pack includes:
    a battery ECU that detects the voltage dividing ratio and generates information indicating the terminal block based on the voltage dividing ratio; and
    a communication unit for performing communication with the control circuit, and
    wherein the information indicating the terminal block to which the battery pack is connected is sent to the control circuit through the communication unit.

5. A battery pack that is connectable to a terminal block, comprising:
    a first battery power supply terminal, a second battery power supply terminal, and a battery ID terminal,
    wherein a power supply voltage having a predetermined voltage is applied between the first battery power supply terminal and the second battery power supply terminal,
    wherein the battery ID terminal divides the power supply voltage into a first voltage to be applied between the first battery power supply terminal and the battery ID terminal, and a second voltage to be applied between the second battery power supply terminal and the battery ID terminal, when the battery pack is connected to the terminal block, and
    wherein the battery pack further includes a battery ECU which detects a voltage dividing ratio expressed as a ratio of the first voltage with respect to the power supply voltage or a ratio of the second voltage with respect to the power supply voltage.

\* \* \* \* \*